United States Patent
Fisk

(10) Patent No.: US 8,764,000 B2
(45) Date of Patent: Jul. 1, 2014

(54) TOOL ALIGNMENT FIXTURE

(75) Inventor: Benjamin T. Fisk, East Granby, CT (US)

(73) Assignee: United Technologies Corporation, Hartford, CT (US)

( * ) Notice: Subject to any disclaimer, the term of this patent is extended or adjusted under 35 U.S.C. 154(b) by 1899 days.

(21) Appl. No.: 11/769,750

(22) Filed: Jun. 28, 2007

(65) Prior Publication Data

US 2009/0000453 A1    Jan. 1, 2009

(51) Int. Cl.
*B23Q 3/18* (2006.01)
*F01D 25/28* (2006.01)
*B23P 15/02* (2006.01)

(52) U.S. Cl.
CPC ............. *B23P 15/02* (2013.01); *B23P 2700/06* (2013.01); *F01D 25/285* (2013.01); *Y10S 269/902* (2013.01)
USPC ........................ 269/289 R; 269/902; 29/281.1

(58) Field of Classification Search
USPC ....................... 269/902, 900, 17, 16; 29/281.1
See application file for complete search history.

(56) References Cited

U.S. PATENT DOCUMENTS

| | | | |
|---|---|---|---|
| 3,438,397 A | 4/1969 | Gilpin | |
| 4,445,678 A * | 5/1984 | George | 269/88 |
| 5,306,401 A | 4/1994 | Fierkens et al. | |
| 5,419,039 A | 5/1995 | Auxier et al. | |
| 6,254,077 B1 * | 7/2001 | Riley, Jr. | 269/287 |
| 6,254,333 B1 | 7/2001 | Merry | |
| 6,308,944 B1 * | 10/2001 | Ota et al. | 269/97 |
| 6,375,160 B1 * | 4/2002 | Hung | 254/8 B |
| 6,539,627 B2 | 4/2003 | Fleck | |
| 6,553,842 B1 | 4/2003 | Tebeau | |
| 6,759,621 B2 | 7/2004 | Varin | |
| 6,824,360 B2 | 11/2004 | Fleck | |
| 6,844,518 B1 | 1/2005 | Coons et al. | |
| 6,997,675 B2 | 2/2006 | Dube et al. | |
| 7,041,933 B2 | 5/2006 | Forrester et al. | |
| 2001/0030261 A1 | 10/2001 | Bourgon et al. | |
| 2004/0182132 A1 | 9/2004 | Head | |
| 2006/0070573 A1 | 4/2006 | Gartland et al. | |
| 2006/0229759 A1 | 10/2006 | Luketic et al. | |
| 2009/0000453 A1 * | 1/2009 | Fisk | 83/745 |

FOREIGN PATENT DOCUMENTS

| | | |
|---|---|---|
| EP | 0547914 | 6/1993 |
| GB | 2428608 | 2/2007 |
| WO | 2006125939 | 11/2006 |

OTHER PUBLICATIONS

European Search Report dated Sep. 30, 2008.

* cited by examiner

*Primary Examiner* — Lee D Wilson
(74) *Attorney, Agent, or Firm* — Carlson, Gaskey & Olds, P.C.

(57) ABSTRACT

An example apparatus for aligning a pressure tapping tool includes a base having an engagement portion. The engagement portion engages a component to limit relative movement between the base and the component. At least one guide mounts adjacent the base. Positioning a pressure tapping tool against the guide aligns the pressure tapping tool for pressure tapping the component. An example method of pressure tapping a component includes limiting relative movement between a fixture and a component and guiding a tool along a fixture when pressure tapping the component. The example may include guiding the tool along different portions of the fixture to pressure tap different portions of the component.

14 Claims, 3 Drawing Sheets

US 8,764,000 B2

TOOL ALIGNMENT FIXTURE

This invention was made with government support under Contract No. N00019-02-C-3003 awarded by the United States Navy. The government therefore has certain rights in this invention.

BACKGROUND OF THE INVENTION

This invention relates generally to a fixture for aligning a tool, and more particularly, to a fixture for aligning a tool for pressure tapping gas turbine engine components.

Gas turbine engines are known, and typically include a compressor for compressing air and delivering it downstream into a combustion section. A fan may move air to the compressor. The compressed air is mixed with fuel and combusted in the combustion section. The products of this combustion are then delivered downstream over turbine rotors, which are driven to rotate and provide power to the engine. Combustion generates thermal energy within the gas turbine engine.

Rotors, and other components within the gas turbine engine, may include cooling holes, which provide an airflow path for providing a protective film layer and removing thermal energy from the gas turbine engine. The holes are drilled in the component during manufacture by laser drill, electro-discharge machining or other techniques. Clogged holes may block flow moving through the component, which can result in undesirable thermal energy buildup. Additional manufacturing steps, such as coating the component, may partially or fully clog the holes or otherwise alter flow. Incorrectly drilled holes could also alter flow through the holes for example.

Testing the components identifies holes with altered flow. Some tests include pressure tapping some of the holes, but only a portion of the total holes within the component are typically pressure tapped. An operator may refer to a testing standard to identify the appropriate holes by number. Formerly, the operator manually counted to identify the appropriate holes.

Disadvantageously, pressure tapping an incorrect hole or misaligning the tool relative to the holes may result in erroneous readings. Formerly, the operator manually recounted holes to verify the appropriate hole was tested, which increases test time and labor costs.

SUMMARY OF THE INVENTION

An example apparatus for aligning a pressure tapping tool includes a base having an engagement portion. The engagement portion engages a component to limit relative movement between the base and the component. At least one guide mounts adjacent the base. Positioning a pressure tapping tool against the guide aligns the pressure tapping tool for pressure tapping the component.

Another example apparatus for aligning a tool relative a turbine blade includes a base for engaging the turbine blade to limit relative movement between the base and the turbine blade. At least one alignment feature mounts to the base. Positioning a tool against the alignment feature aligns the tool in a desired position relative the turbine blade.

An example method of pressure tapping a component includes limiting relative movement between a fixture and a component and guiding a tool along a fixture when pressure tapping the component. The example method may further include guiding the tool along different portions of the fixture when pressure tapping different portions of the component.

BRIEF DESCRIPTION OF THE DRAWINGS

The various features and advantages of this invention will become apparent to those skilled in the art from the following detailed description of an embodiment of the invention. The drawings that accompany the detailed description can be briefly described as follows.

DETAILED DESCRIPTION OF THE PREFERRED EMBODIMENT

Figure 1:
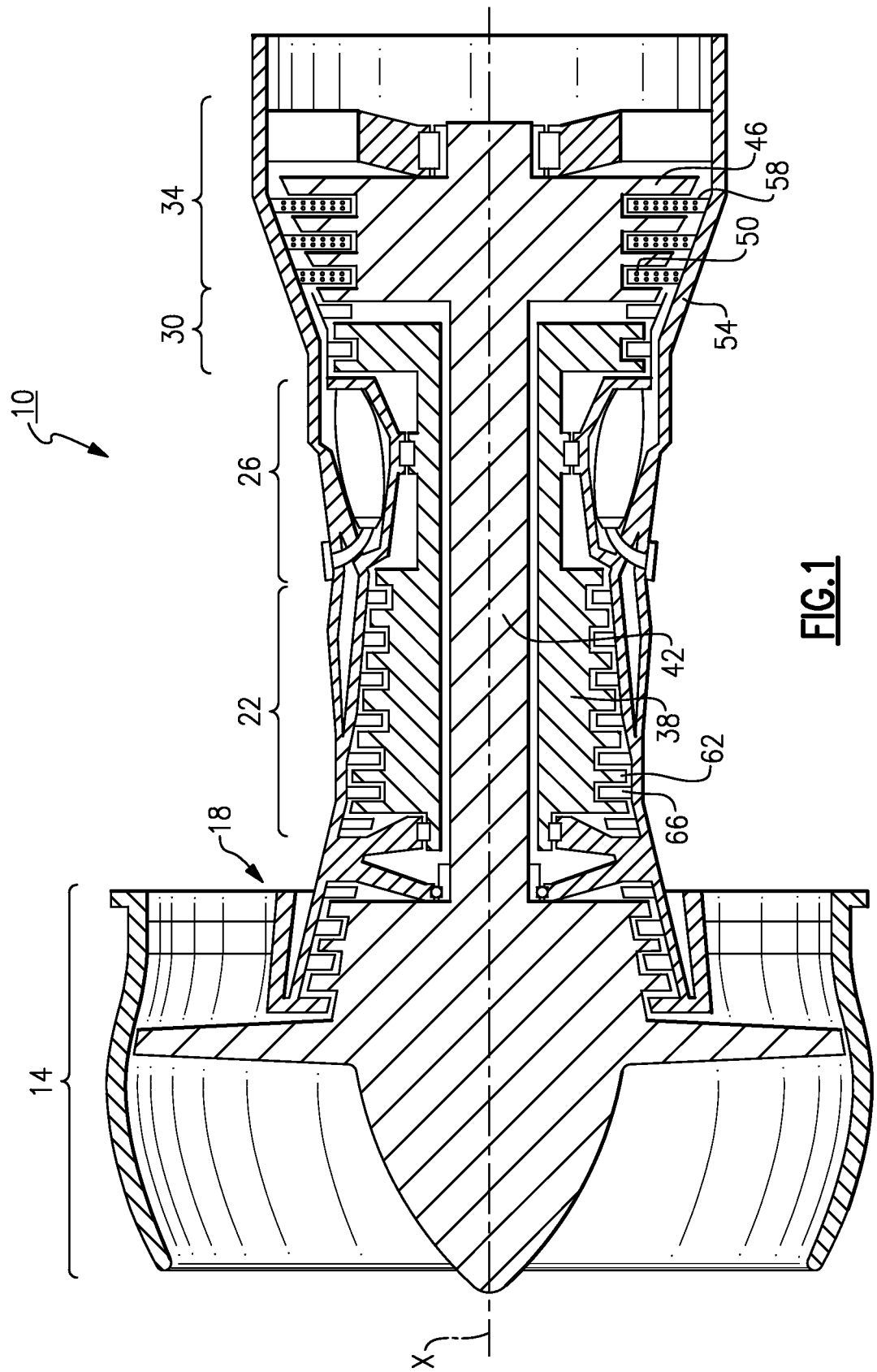
FIG. 1 illustrates a schematic sectional view of a gas turbine engine.

FIG. 1 schematically illustrates an example gas turbine engine 10 including (in serial flow communication) a fan section 14, a low pressure compressor 18, a high pressure compressor 22, a combustor 26, a high pressure turbine 30, and a low pressure turbine 34. The gas turbine engine 10 is circumferentially disposed about an engine centerline X. During operation, air is pulled into the gas turbine engine 10 by the fan section 14, pressurized by the compressors 18 and 22, mixed with fuel, and burned in the combustor 26. Hot combustion gases generated within the combustor 26 flow through high and low pressure turbines 30, 34 which extract energy from the hot combustion gases.

In a two spool design, the high pressure turbine 30 utilizes the extracted energy from the hot combustion gases to power the high pressure compressor 22 through a high speed shaft 38, and a low pressure turbine 34 utilizes the energy extracted from the hot combustion gases to power the low pressure compressor 18 in the fan section 14 through a low speed shaft 42. However, the invention is not limited to components within the two spool gas turbine architecture described. It may be used with other architectures such as a single spool design, a three spool design, a geared fan design, and other architectures. That is, there are various types of gas turbine engines, many of which can benefit from the examples disclosed herein, which are not limited to the design showed.

The high and low pressure turbines 30, 34 include a plurality of rotor blades 46 rotating about the axis X. A plurality of guide vanes 50 guide and align airflow through the plurality of rotor blades 46. The plurality of guide vanes extend from an engine case 54. The rotor blades 46 and the guide vanes 50 each include a plurality of cooling holes 58, which help remove thermal energy from the rotor blades 46 and the guide vanes 50 in a known manner. Other components within the gas turbine engine 10 may include similar cooling holes 58 to remove thermal energy. For example, a plurality of compressor rotors 62 and a plurality of compressor blades 66 may include similar cooling holes 58.

Figure 2:
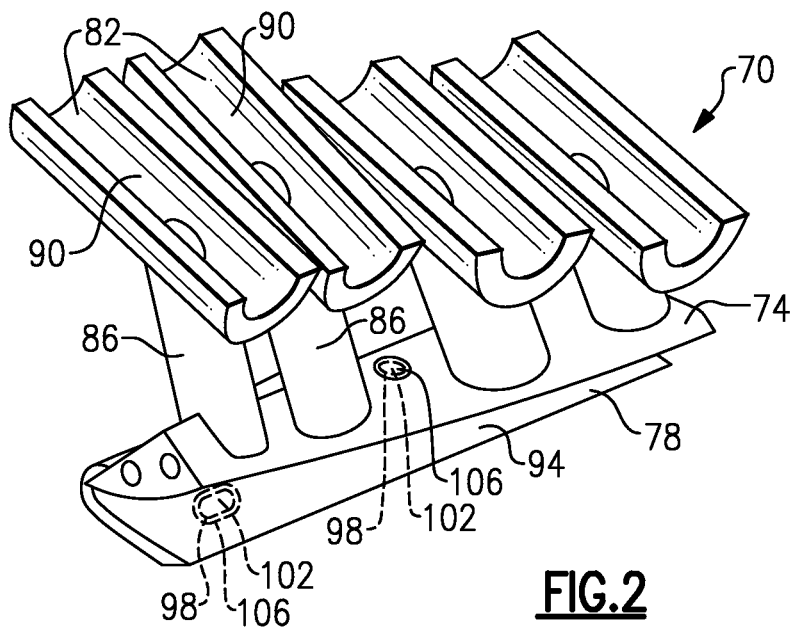
FIG. 2 illustrates an example fixture for aligning a tool.

An example fixture 70 includes a base 74 having an engagement portion 78 as shown in FIG. 2. Extensions 86 secure a plurality of guides 82 to the base 74. The guides 82 each include one of a plurality of recessed areas 90 for receiving a tool. As the fixture 70 is preferably steel, the example extensions 86 are ordinarily welded to the base 74 and the guides 82. Other materials such as plastics or epoxy resins may also be molded to the required shape of the fixture 70.

A compressible material 94 lines and cushions the engagement portion 78. The base 74 includes a plurality of edges 98 each defining an aperture 102, which extends through the base 74. An extension 106 of the compressible material 94 extends through the aperture 102. The end of the extension 106 is oversized relative to the aperture 102 to limit movement of the compressible material 94 relative to the base 74. The oversized portion of the extension 106 limits the compressible material 94 from pulling through the aperture 102. In one example, the compressible material 94 is a silicon rubber, such as Dow Corning Silastic J, which is molded to the engagement portion 78.

The compressible material 94 protects the components from damage. Repeated use of the fixture 70, and specifically repeated mounting of the fixture 70 on a turbofan engine component, may wear the compressible material 94 and eventually expose the engagement portion 78. In one example, the compressible material 94 is replaced by removing the extension 106 from the aperture 102 by cutting the extension 106 from the rest of the compressible material 94.

Figure 3:
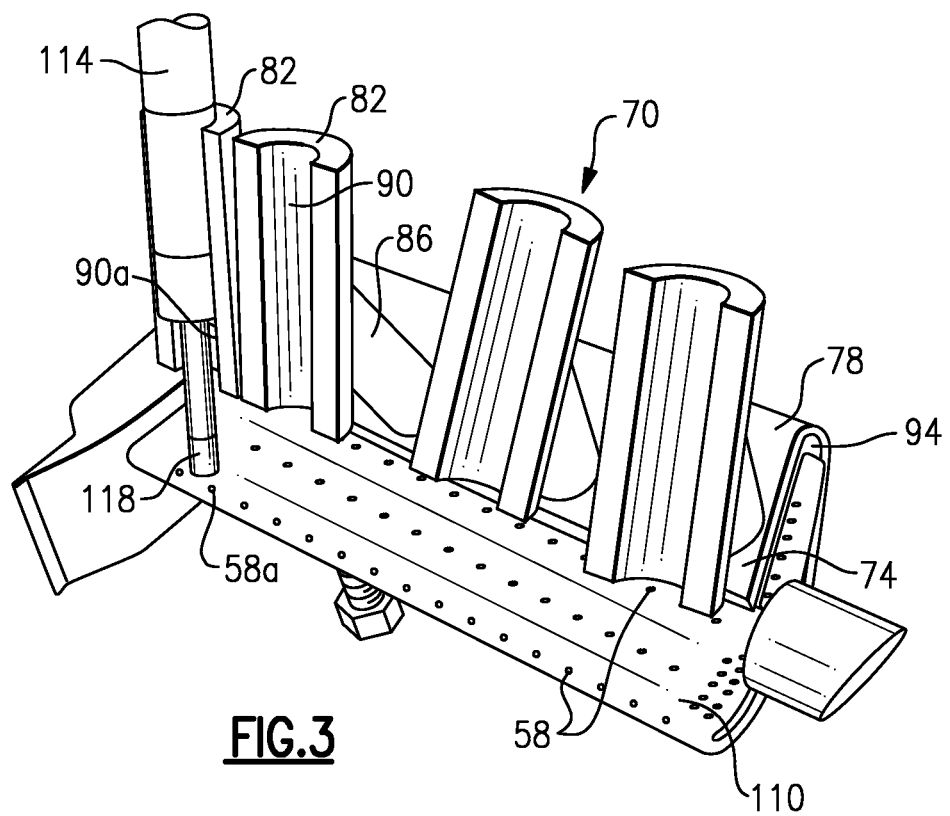
FIG. 3 illustrates the fixture of FIG. 2 engaging a turbine blade and guiding a pressure tapping tool.

FIG. 3 illustrates the example fixture 70 engaging a component 110, here a second blade of the low pressure turbine 34 (FIG. 1). As shown, the component 110 includes multiple cooling holes 58 aligned in rows along the radial length of the component 110. As known, pressure tapping measures the pressure ratio between air on the inside of the component 110 and the outside of the component 110 during manufacture. In this example, air moves through the component 110 and out through the cooling holes 58 in a known manner during pressure tapping.

A pressure tapping tool 114 includes a polymer end portion 118 for contacting the component 110. When pressure tapping, an operator positions the pressure tapping tool 114 against a recessed area 90a in the fixture 70 to angularly align the pressure tapping tool 114 relative to a desired hole 58a. The recessed area 90a of the guide 82 at least partially controls the position of the pressure tapping tool 114 relative to the component 110 as the location of the recessed area 90a is fixed relative to the component 110. Thus, an operator positioning the pressure tapping tool 114 within the recessed area 90a limits the potential areas of contact between the end portion 118 and the component 110 to ensure the proper hole 58 is inspected.

In this example, pressure tapping test specifications require pressure tapping the component 110 at four different holes 58, which correspond to the four recessed areas 90 of the fixture 70. FIG. 3 illustrates the pressure tapping tool 114 in a position aligned with, and just prior to pressure tapping, the cooling hole 58a. An operator would move the pressure tapping tool 114 to the remaining recessed areas 90 to pressure tap the remaining holes 58 sequentially.

The geometry of the component 110, and specifically the holes 58 to be pressure tapped, establishes the angle of the recessed areas 90 and other portions of the fixture 70. Pressure tapping other locations within the component 110 may include designing another fixture 70 with dimensional adjustments to the plurality of guides 82, the recessed areas 90, or both.

Figure 4:
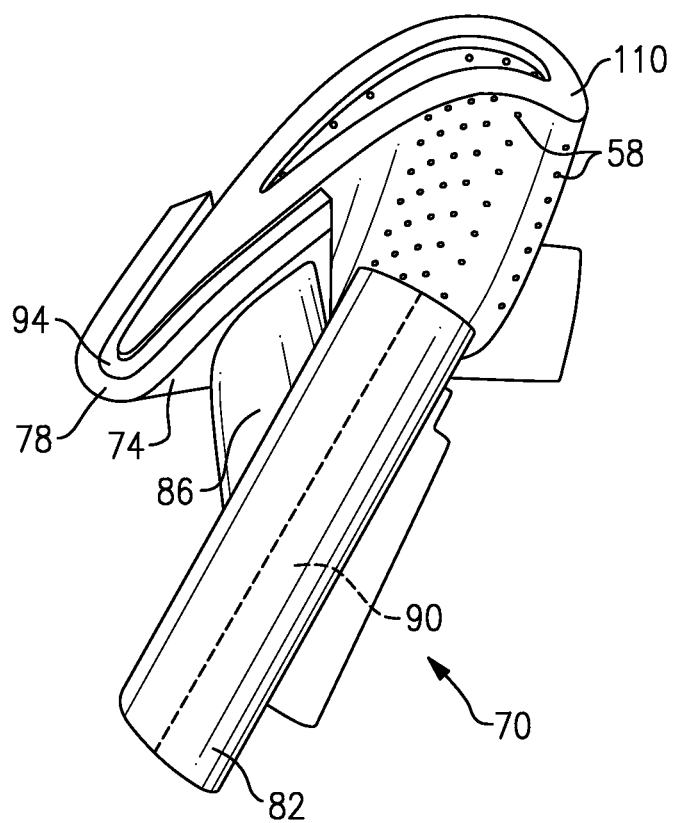
FIG. 4 illustrates an end view of the fixture of FIG. 2 engaging a turbine blade.

As shown in the end view of FIG. 4, the base 74 of the fixture 70 has a general "V" shape profile. The fixture 70 engages the component 110 within the engagement portion 78 on the interior of the "V." The component 110 and the engagement portion 78 sandwich the compressible material 94. The compressible material 94 may be slightly oversized relative to the general profile of the component 110 within the engagement portion 78, thus engaging the component 110 compresses the compressible material 94. The compressible material 94 thereby providing an interference fit between the component 110 and the engagement portion 78.

Although a preferred embodiment of this invention has been disclosed, a worker of ordinary skill in this art would recognize that certain modifications would come within the scope of this invention. For that reason, the following claims should be studied to determine the true scope and content of this invention.

I claim:

1. An apparatus for aligning a pressure tapping tool, the apparatus comprising:
   a base;
   an engagement portion of said base, said engagement portion for engaging a component to limit relative movement between said base and the component;
   at least one guide mounted adjacent said base, wherein positioning a pressure tapping tool against said at least one guide aligns the pressure tapping tool for pressure tapping the component; and
   a compressible material for positioning between said engagement portion and the component, said compressible material at least partially compressed when said engagement portion engages the component,
   wherein said engagement portion includes an edge portion defining an aperture, said edge portion surrounding an extension of said compressible material, and said extension contacts said edge portion to limit relative movement between said compressible material and said engagement portion.

2. The apparatus of claim 1, wherein said at least one guide comprises an extension for securing said at least one guide to said base.

3. The apparatus of claim 1, wherein said guide includes a recessed area for receiving said pressure tapping tool.

4. The apparatus of claim 1, wherein said compressible material comprises a polymer material.

5. The apparatus of claim 1, wherein the component is a turbofan engine component and positioning a pressure tapping tool against said at least one guide aligns the pressure tapping tool with a desired pressure tapping location on the turbofan engine component.

6. The apparatus of claim 1, wherein the component is a turbine blade and positioning a pressure tapping tool against said at least one guide aligns the pressure tapping tool with a desired pressure tapping location on the turbine blade.

7. An apparatus for aligning a tool relative a blade for a gas turbine engine, the apparatus comprising:
   a base for engaging a blade to limit relative movement between said base and said blade;
   at least one alignment feature mounted to said base, wherein positioning a tool against said alignment feature aligns the tool in a desired position relative to the blade; and
   a compressible material for positioning between an engagement portion of said base and the component, said compressible material at least partially compressed when said engagement portion engages the component,
   wherein said engagement portion includes an edge portion defining an aperture, said edge portion surrounding an extension of said compressible material, and said extension contacting said edge portion to limit relative movement between said compressible material and said engagement portion.

8. The apparatus of claim 7, wherein said alignment feature is for positioning a pressure tapping tool.

9. The apparatus of claim 7, wherein the blade includes a plurality of desired pressure tap locations, each of said at least one alignment feature corresponding to one of said desired plurality of pressure tap locations.

10. The apparatus of claim 7, wherein said base has a general "V" shape cross-section.

11. A pressure tapping tool apparatus comprising:
    a base;

an engagement portion of said base, said engagement portion adapted to engage a component to limit relative movement between said base and the component;

at least one guide mounted adjacent said base, wherein said at least one guide is configured to receive a pressure tapping tool, wherein the pressure tapping tool is in a pressure tapping position when received within the guide; and a compressible material for positioning between said engagement portion and the component, said compressible material at least partially compressed when said engagement portion engages the component, wherein said engagement portion includes an edge portion defining an aperture, said edge portion surrounding an extension of said compressible material, and said extension contacting said edge portion to limit relative movement between said compressible material and said engagement portion.

12. The apparatus of claim 11, wherein said component is a gas turbine engine blade.

13. The apparatus of claim 1, wherein said at least one guide comprises a recessed area configured to receive said pressure tapping tool.

14. The apparatus of claim 7, wherein said at least one alignment feature is configured to receive the tool such that the tool is in a pressure tapping location.

* * * * *